US012492101B2

(12) United States Patent
Saito et al.

(10) Patent No.: US 12,492,101 B2
(45) Date of Patent: Dec. 9, 2025

(54) ELEVATOR APPARATUS

(71) Applicant: Hitachi, Ltd., Tokyo (JP)

(72) Inventors: Yuki Saito, Tokyo (JP); Akira Iwamoto, Tokyo (JP); Hiroki Matsuura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/834,406

(22) PCT Filed: Mar. 17, 2022

(86) PCT No.: PCT/JP2022/012387
§ 371 (c)(1),
(2) Date: Jul. 30, 2024

(87) PCT Pub. No.: WO2023/175856
PCT Pub. Date: Sep. 21, 2023

(65) Prior Publication Data
US 2025/0136411 A1 May 1, 2025

(51) Int. Cl.
*B66B 5/22* (2006.01)
*B66B 1/32* (2006.01)
*B66B 5/02* (2006.01)

(52) U.S. Cl.
CPC .................. *B66B 5/22* (2013.01); *B66B 1/32* (2013.01); *B66B 5/027* (2013.01)

(58) Field of Classification Search
CPC .. B66B 5/22; B66B 5/027; B66B 5/18; B66B 1/32
See application file for complete search history.

(56) References Cited

U.S. PATENT DOCUMENTS 6,003,636 A 12/1999 Yumura
2019/0047820 A1* 2/2019 Cao ........................ F16D 49/22
(Continued)

FOREIGN PATENT DOCUMENTS

EP 3216735 A1 * 9/2017 ............. B66B 5/027
JP 07-023769 U 5/1995
(Continued)

OTHER PUBLICATIONS

International Search Report of PCT/JP2022/012387 dated May 17, 2022.

*Primary Examiner* — Anna M Momper
*Assistant Examiner* — Michelle M Mudwilder
(74) *Attorney, Agent, or Firm* — MATTINGLY & MALUR, PC

(57) ABSTRACT

An elevator has a power outage operation function including an emergency stop device that is provided in the elevator car, and a drive mechanism that is configured to drive the emergency stop device. An electric actuator is configured to actuate the drive mechanism, and a control device is configured to control an operation of the car. The electric actuator includes a movable element mechanically connected to the drive mechanism, electromagnets facing the element, and a mechanism to convert rotation of a motor into linear movement of the electromagnets. When the control device determines that the electric actuator is actuated due to a power outage, the control device instructs the electric actuator to perform a return operation of returning the movable element to a standby position, and operates the car to move up and land on a nearest floor above a stop position of the car when the return operation fails.

8 Claims, 6 Drawing Sheets

(56) References Cited

U.S. PATENT DOCUMENTS

| | | | | |
|---|---|---|---|---|
| 2019/0308846 | A1* | 10/2019 | Koskinen | B66B 5/0087 |
| 2020/0071129 | A1* | 3/2020 | Ruhnke | B66B 1/3461 |
| 2020/0130985 | A1* | 4/2020 | Ruhnke | B66B 5/22 |
| 2020/0165102 | A1* | 5/2020 | Schulz | B66B 5/22 |
| 2023/0022982 | A1* | 1/2023 | Bewersdorf | B66B 5/027 |
| 2024/0174488 | A1* | 5/2024 | Drouet | B66B 1/36 |

FOREIGN PATENT DOCUMENTS

| | | | | |
|---|---|---|---|---|
| JP | 2004-099330 | A | 4/2004 | |
| JP | 2021-046280 | A | 3/2021 | |
| JP | 2021-130550 | A | 9/2021 | |
| WO | WO-2007060733 | A1 * | 5/2007 | B66B 5/0031 |
| WO | WO-2020110437 | A1 * | 6/2020 | B66B 5/22 |
| WO | WO-2021044662 | A1 * | 3/2021 | B66B 5/22 |
| WO | 2022/038656 | A1 | 2/2022 | |

* cited by examiner

[FIG. 1]
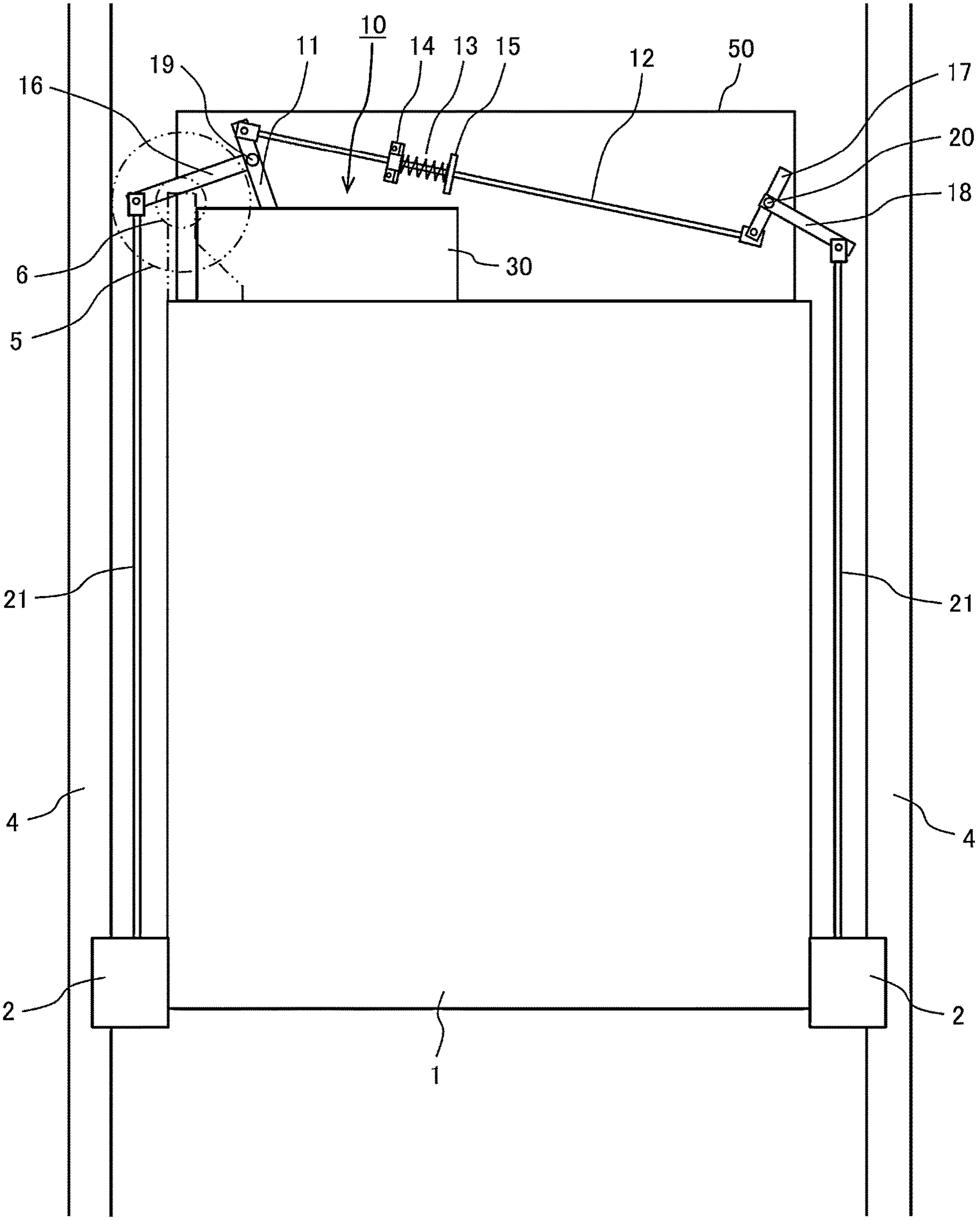

[FIG. 2]
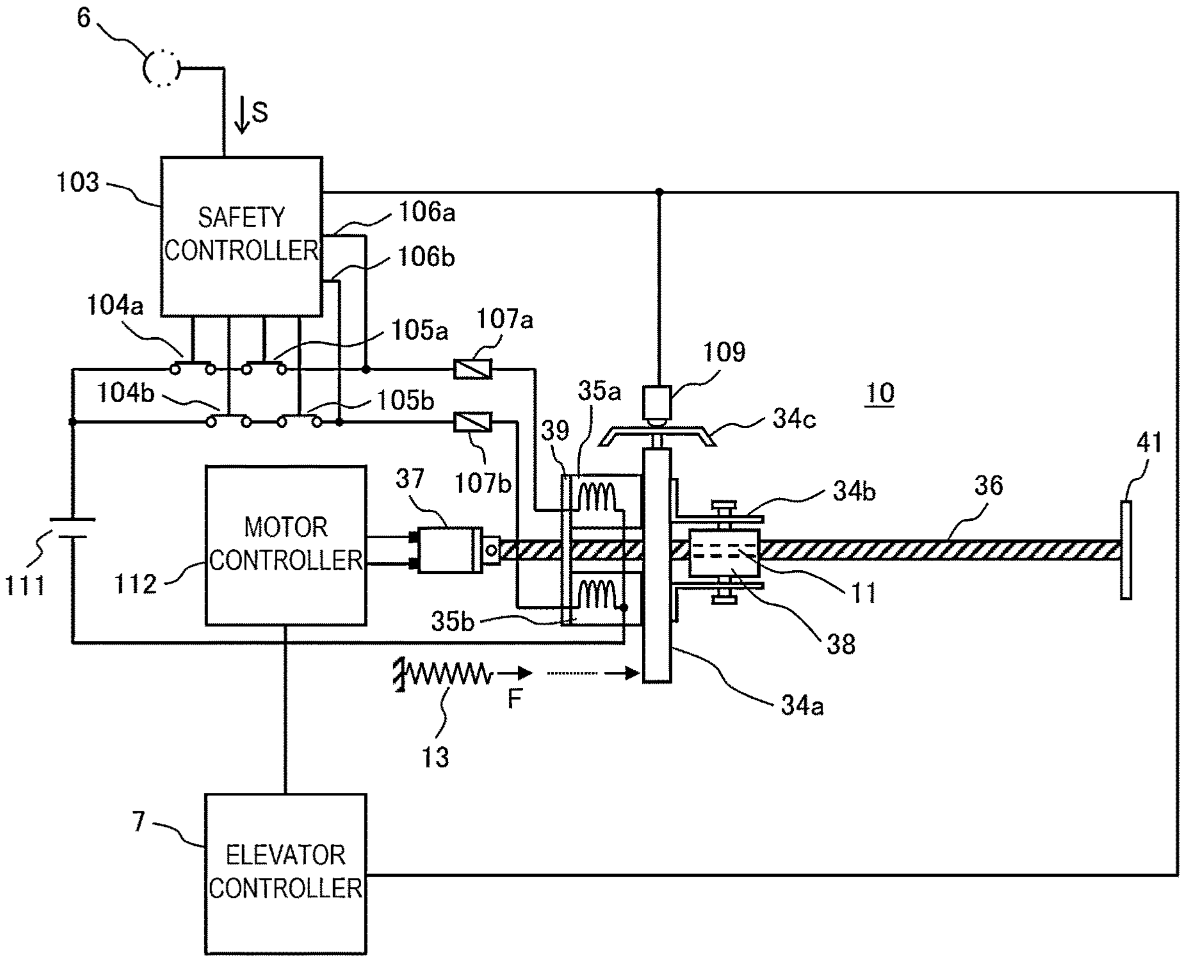

[FIG. 3]
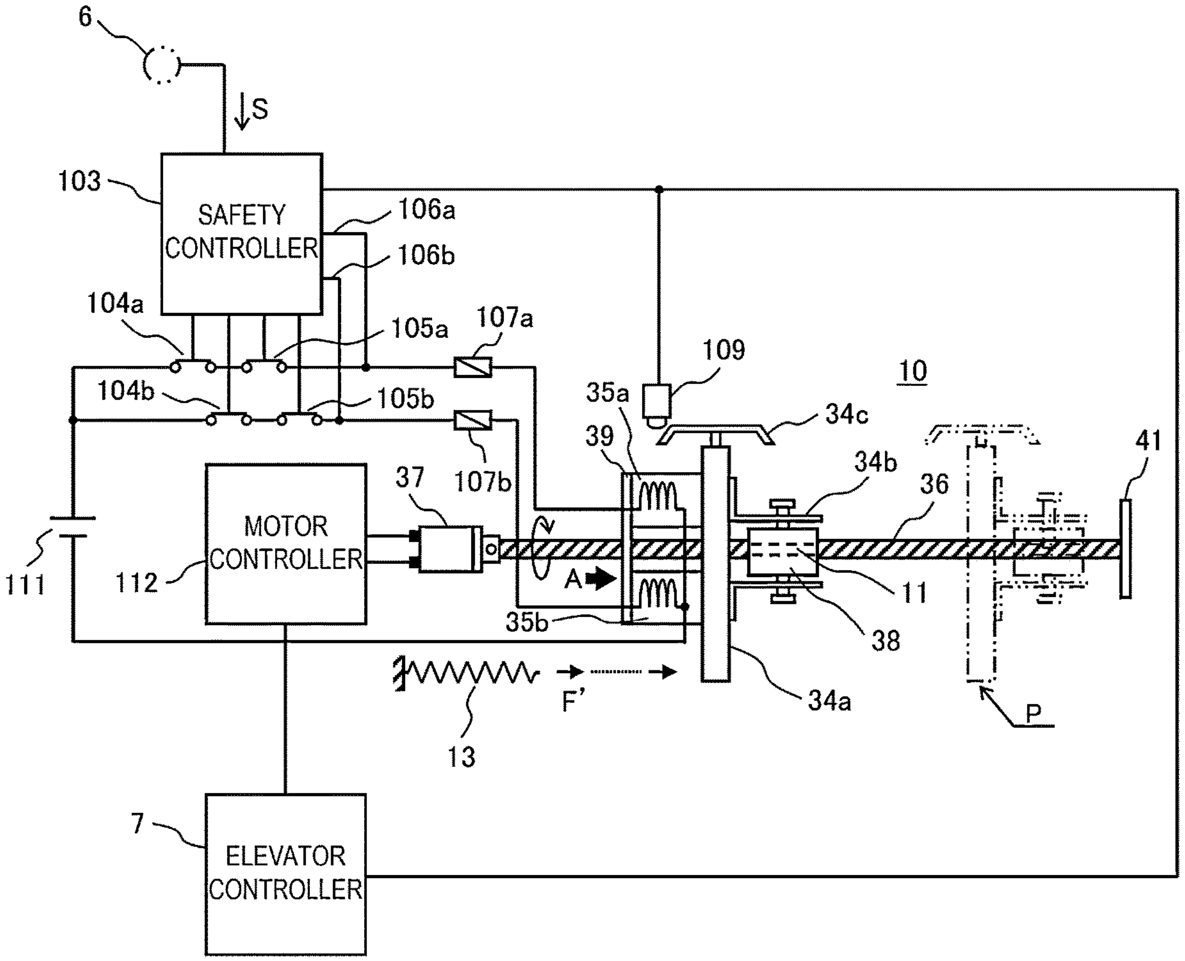

[FIG. 4]
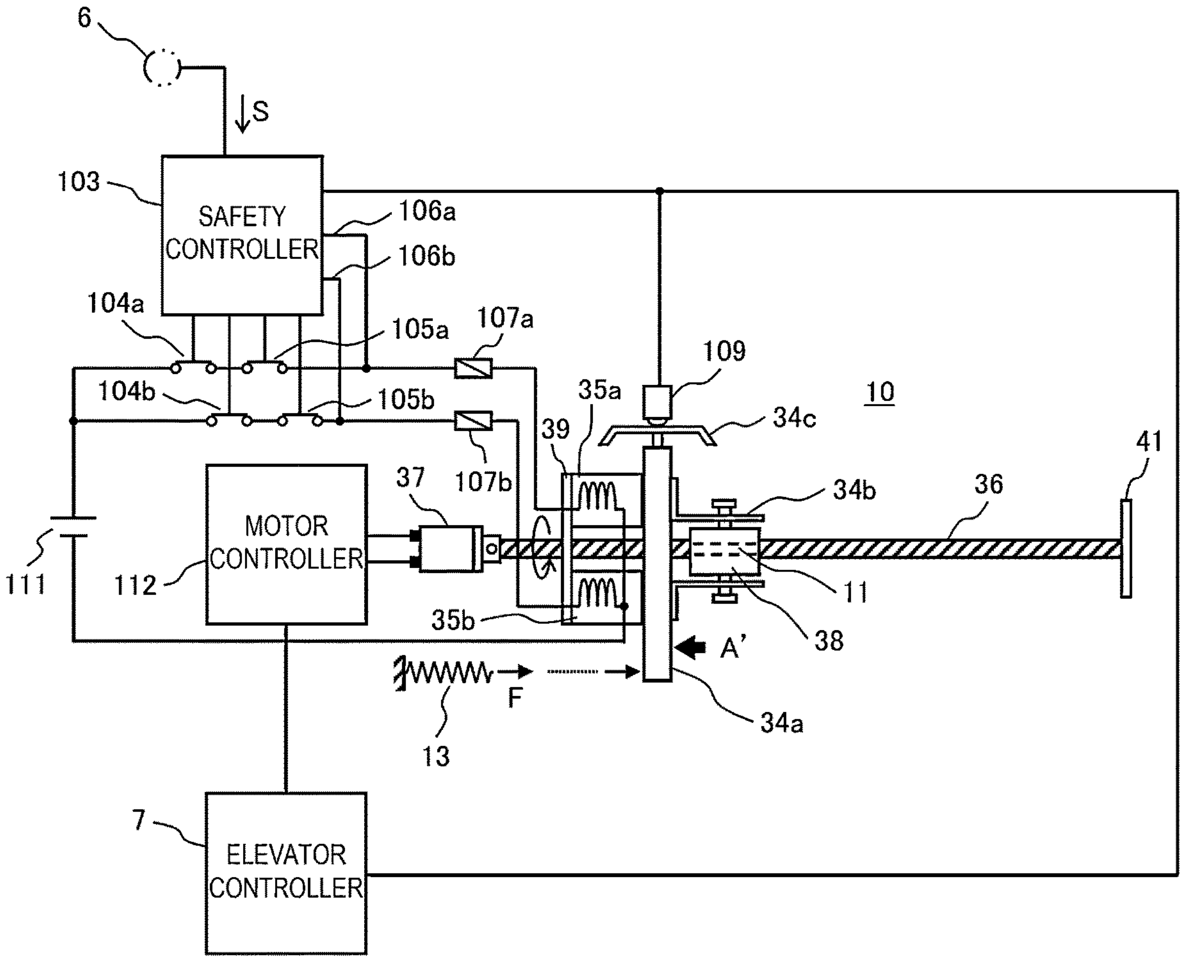

[FIG. 5]
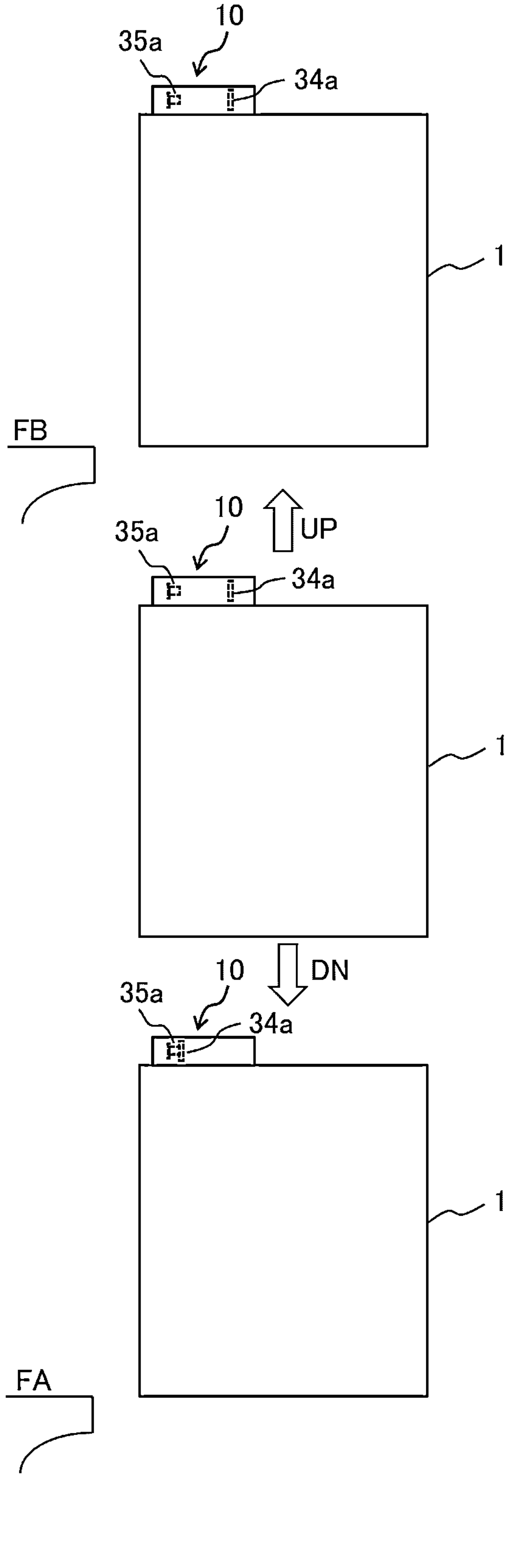

[FIG. 6]
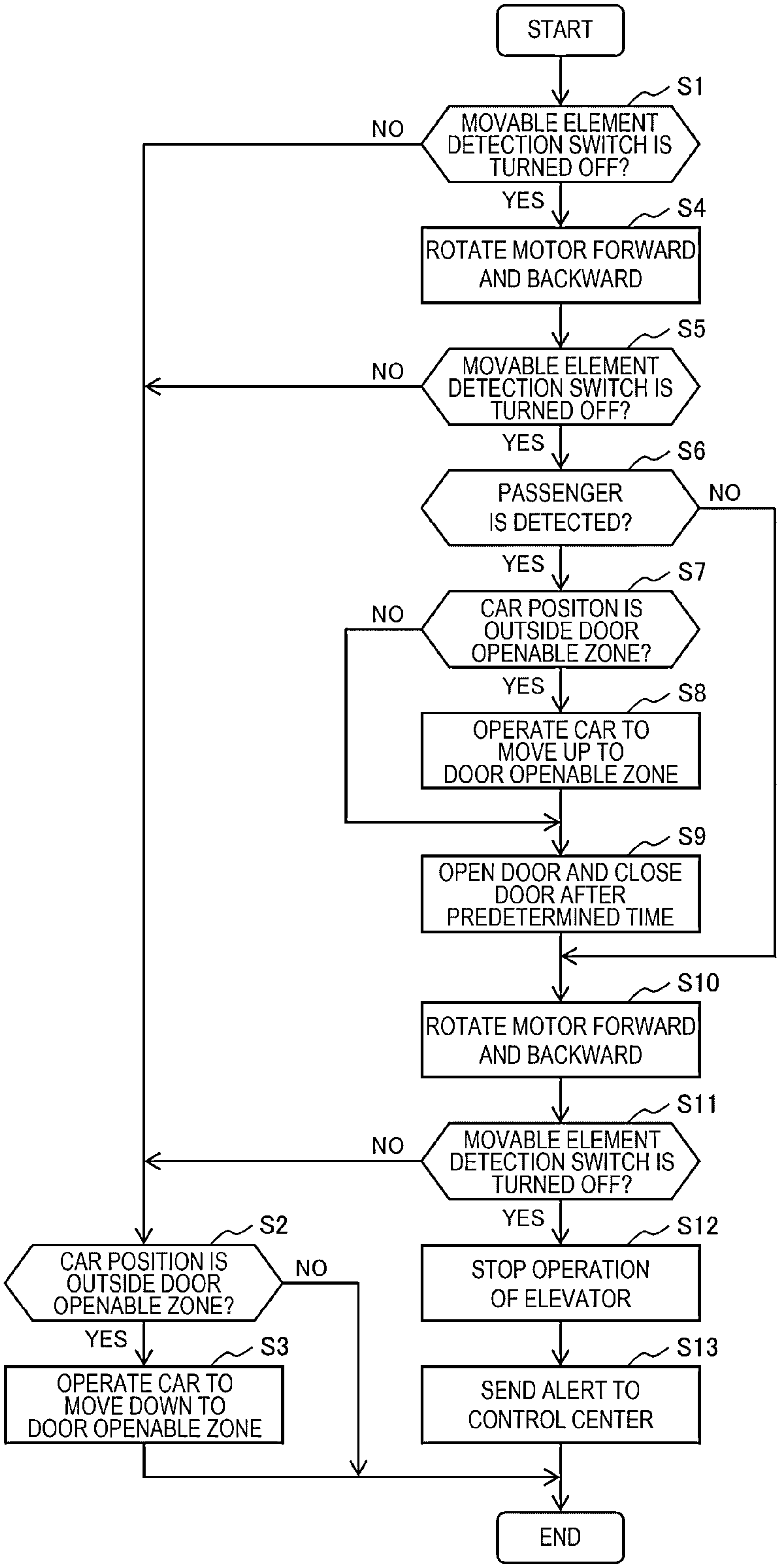

ELEVATOR APPARATUS

TECHNICAL FIELD

The present invention relates to an elevator apparatus including an emergency stop device that is actuated by an electric actuator.

BACKGROUND ART

An elevator apparatus includes a governor and an emergency stop device in order to constantly monitor an elevating speed of a car and emergency-stop the car in a predetermined overspeed state. Generally, the car and the governor are coupled to each other by a governor rope. When the overspeed state is detected, the governor restricts the governor rope to operate the emergency stop device on a car side and emergency-stop the car.

In such an elevator apparatus, since the governor rope that is elongated is laid in a hoistway, it is difficult to save space and reduce cost. Further, when the governor rope swings, a structure in the hoistway is likely to interfere with the governor rope.

In view of these problems, an emergency stop device that is actuated electrically without using a governor rope is proposed. A technique related to such an emergency stop device in the related art is disclosed in PTL 1.

In the related art, a car is provided with a drive shaft that drives an emergency stop device, and an electric actuator that actuates the drive shaft. The electric actuator includes a movable iron core mechanically connected to the drive shaft, and an electromagnet that attracts the movable iron core. The drive shaft is biased by a drive spring, but during normal times, movement of the drive shaft is restricted by the electric actuator since the electromagnet is energized and the movable iron core is attracted.

In an emergency, the electromagnet is demagnetized to release the restriction of the drive shaft, and the drive shaft is driven by a biasing force of the drive spring. As a result, the emergency stop device is actuated to emergency-stop the car.

When the emergency stop device is returned to a normal state, the electromagnet is moved and brought close to the movable iron core moved in an emergency. The electromagnet includes a feed nut that is screwed onto a feed screw shaft. When the feed screw shaft is rotated by a motor, the electromagnet moves toward the movable iron core. When the electromagnet comes into contact with the movable iron core, the movable iron core is attracted to the electromagnet. In a state in which the movable iron core is attracted to the electromagnet, the electromagnet is further moved to return the movable iron core and the electromagnet to a normal standby position.

CITATION LIST

Patent Literature

PTL 1: JP2021-130550A

SUMMARY OF INVENTION

Technical Problem

In the related art described above, when a power supply to the electromagnet is lost due to a power outage, the electric actuator is actuated and the emergency stop device is actuated as in a case when an overspeed state is detected. Therefore, it is difficult to operate the car during a power outage or power restoration depending on a state of the electric actuator.

Therefore, the invention provides an elevator apparatus having a power outage operation function while including an emergency stop device actuated by an electric actuator.

Solution to Problem

In order to solve the above problem, an elevator apparatus according to the invention includes a car, an emergency stop device provided in the car, a drive mechanism configured to drive the emergency stop device, an electric actuator configured to actuate the drive mechanism, and a control device configured to control an operation of the car. The electric actuator includes a movable element mechanically connected to the drive mechanism, an electromagnet facing the movable element, and a mechanism unit configured to convert rotation of a motor into linear movement of the electromagnet. In a case where the control device determines that the electric actuator is actuated due to a power outage, the control device instructs the electric actuator to perform a return operation of returning the movable element to a standby position by the mechanism unit, and operates the car to move up and lands the car on a nearest floor above a stop position of the car when the control device determines that the return operation fails.

Advantageous Effects of Invention

According to the invention, the elevator apparatus including the emergency stop device actuated by the electric actuator can have a power outage operation function.

Problems, configurations, and effects other than those described above will become apparent in the following description of embodiments.

BRIEF DESCRIPTION OF DRAWINGS

FIG. 1 is a schematic configuration diagram showing an elevator apparatus according to an embodiment.

FIG. 2 is a plan view showing mechanical portions and electrical device portions of an electric actuator 10.

FIG. 3 is a plan view showing an operation state of the electric actuator 10 during a return operation (immediately before completion).

FIG. 4 is a plan view showing an operation state of the electric actuator 10 when the return operation is completed.

FIG. 5 is a diagram showing an operation state of a car and showing a power outage operation function of the elevator apparatus according to the present embodiment.

FIG. 6 is a flowchart showing power outage operation processing according to the embodiment.

DESCRIPTION OF EMBODIMENTS

Hereinafter, an elevator apparatus according to an embodiment of the invention will be described with reference to the drawings. In the drawings, components having the same reference numerals indicate the same components or components having similar functions.

FIG. 1 is a schematic configuration diagram showing an elevator apparatus according to an embodiment of the invention.

As shown in FIG. 1, the elevator apparatus includes a car 1, speed sensors (5, 6), an electric actuator 10, drive mechanisms (12 to 20), pull-up rods 21, and emergency stop devices 2.

The car 1 is suspended by a main rope (not shown) in a hoistway provided in a building, and is slidably engaged with guide rails 4 via guide devices. When the main rope is frictionally driven by a drive device (hoist: not shown), the car 1 is moved up and down in the hoistway.

The speed sensor in the present embodiment is provided on the car 1, and includes a rotary detector 6 and a roller 5 connected to a rotation shaft of the rotary detector 6. In the present embodiment, the roller 5 is connected to the rotation shaft of the rotary detector 6 such that a rotation shaft of the roller 5 and the rotation shaft of the rotary detector 6 are coaxial. For example, a rotary encoder can be applied as the rotary detector 6.

The roller 5 is in contact with the guide rail 4. Therefore, the roller 5 rotates when the car 1 moves up and down, and the rotary detector 6 rotates accordingly. A safety controller to be described later monitors a traveling speed of the car 1 based on a rotational position signal output by the rotary detector 6 accompanying the rotation.

An image sensor may be used as the speed sensor. In this case, a position and a speed of the car 1 are detected based on image information on a surface state of the guide rail 4 acquired by the image sensor. For example, the speed is calculated based on a movement distance of an image feature in a predetermined time.

In the present embodiment, the electric actuator 10 is an electromagnetic operation device and is disposed on an upper portion of the car 1. The electromagnetic operation device includes, for example, a movable piece or a movable rod actuated by a solenoid or an electromagnet. The electric actuator 10 is actuated when the speed sensors (5, 6) detect a predetermined overspeed state of the car 1. At this time, the pull-up rods 21 are pulled up by the drive mechanisms (12 to 20) that are mechanically connected to an operation lever 11. Accordingly, the emergency stop device 2 enters a braking state.

The drive mechanisms (12 to 20) will be described later.

One emergency stop device 2 is disposed on each of left and right sides of the car 1. A pair of braking elements (not shown) provided in each emergency stop device 2 are movable between a braking position and a non-braking position, and clamp the guide rails 4 in the braking position. When the emergency stop device 2 moves up relative to the car 1 due to the car 1 moving down, a braking force is generated by a frictional force acting between the braking elements and the guide rails 4. Accordingly, the emergency stop device 2 is actuated when the car 1 falls into an overspeed state, and emergency-stops the car 1.

The elevator apparatus in the present embodiment includes a so-called ropeless governor system that does not use a governor rope. When an elevating speed of the car 1 exceeds a rated speed and reaches a first overspeed (for example, a speed that does not exceed a speed 1.3 times the rated speed), a power supply to the drive device (the hoist) and a power supply to a control device that controls the drive device are cut off. When a descending speed of the car 1 reaches a second overspeed (for example, a speed that does not exceed a speed 1.4 times the rated speed), the electric actuator 10 provided on the car 1 is electrically driven to actuate the emergency stop device 2 and emergency-stop the car 1.

In the present embodiment, the ropeless governor system includes the speed sensors (5, 6) and the safety controller that determines an overspeed state of the car 1 based on output signals of the speed sensors. The safety controller measures a speed of the car 1 based on the output signals of the speed sensors. When the safety controller determines that the measured speed reaches the first overspeed, the safety controller outputs a command signal for cutting off the power supply to the drive device (the hoist) and the power supply to the control device that controls the drive device. When the safety controller determines that the measured speed reaches the second overspeed, the safety controller outputs a command signal for actuating the electric actuator 10.

As described above, when the pair of braking elements provided in the emergency stop device 2 are pulled up by the pull-up rods 21, the pair of braking elements clamp the guide rails 4. The pull-up rods 21 are driven by the drive mechanisms (12 to 20) connected to the electric actuator 10.

Hereinafter, a configuration of the drive mechanisms will be described.

The operation lever 11 of the electric actuator 10 is coupled to a first actuating piece 16 to form a substantially T-shaped first link member. The operation lever 11 and the first actuating piece 16 respectively constitute a head portion and a foot portion of a T shape. The substantially T-shaped first link member is pivotably supported by a crosshead 50 via a first actuating shaft 19 at a coupling portion between the operation lever 11 and the first actuating piece 16. One of a pair of pull-up rods 21 (on a left side in the drawing) has an end portion connected to an end portion of the first actuating piece 16 that is the foot portion of the T shape and is located on a side opposite to the coupling portion between the operation lever 11 and the first actuating piece 16.

A connection piece 17 is coupled to a second actuating piece 18 to form a substantially T-shaped second link member. The connection piece 17 and the second actuating piece 18 respectively constitute a head portion and a foot portion of a T shape. The substantially T-shaped second link member is pivotably supported by the crosshead 50 via a second actuating shaft 20 at a coupling portion between the connection piece 17 and the second actuating piece 18. The other one of the pair of pull-up rods 21 (on a left side in the drawing) has an end portion connected to an end portion of the second actuating piece 18 that is the foot portion of the T shape and is located on a side opposite to the coupling portion between the connection piece 17 and the second actuating piece 18.

An end portion of the operation lever 11 that extends from inside to outside of a case 30 and one of two end portions of the connection piece 17 that is closer to an upper portion of the car 1 than is the second actuating shaft 20 are respectively connected to one end (on the left side in the drawing) and the other end (on the right side in the drawing) of a drive shaft 12 lying transversely on the car 1. The drive shaft 12 slidably passes through a fixed portion 14 fixed to the crosshead 50. The drive shaft 12 passes through a pressing member 15, and the pressing member 15 is fixed to the drive shaft 12. The pressing member 15 is located on a second link member (the connection piece 17 and the second actuating piece 18) side relative to the fixed portion 14. A drive spring 13 that is an elastic body is located between the fixed portion 14 and the pressing member 15, and the drive shaft 12 is inserted through the drive spring 13.

When the electric actuator 10 is actuated, that is, when energization to an electromagnet in the present embodiment is cut off, an electromagnetic force that restricts movement of the operation lever 11 against a biasing force of the drive spring 13 disappears. Therefore, the drive shaft 12 is driven along a longitudinal direction by the biasing force of the drive spring 13 applied to the pressing member 15. Therefore, the first link member (the operation lever 11 and the first actuating piece 16) pivots about the first actuating shaft 19, and the second link member (the connection piece 17 and the second actuating piece 18) pivots about the second actuating shaft 20. Accordingly, one of the pull-up rods 21 connected to the first actuating piece 16 of the first link member is driven and pulled up, and the other pull-up rod 21 connected to the second actuating piece 18 of the second link member is driven and pulled up at the same time.

FIG. 2 is a plan view showing mechanical portions and electrical device portions of the electric actuator 10 according to the present embodiment in an installed state shown in FIG. 1. The electric actuator 10 shown in FIG. 2 is stored in the case 30 shown in FIG. 1 (the same applies to FIGS. 3 and 4).

FIG. 2 also shows a circuit configuration for controlling the electrical device portions (the same applies to FIGS. 3 and 4). In FIG. 2, the emergency stop devices 2 (FIG. 1) are in a non-braking state, and the electric actuator 10 is in a standby state. That is, the elevator apparatus is in a normal operation state.

As shown in FIG. 2, in the standby state, a movable element (34*a*, 34*b*, 34*c*) that is a movable member connected to the operation lever 11 is attracted by electromagnetic forces to electromagnets 35*a* and 35*b* whose coils are energized and excited. Accordingly, movement of the movable element is restricted against a biasing force F of the drive spring 13 (FIG. 1) acting on the movable element via the drive shaft 12 (FIG. 1) and the operation lever 11. Accordingly, the electric actuator 10 restricts movement of the drive mechanisms (12 to 20: FIG. 1) against the biasing force of the drive spring 13.

The movable element includes an attraction portion 34*a* that is attracted to pole surfaces of the electromagnets 35*a* and 35*b* and a support portion 34*b* that is fixed to the attraction portion 34*a* and to which the operation lever 11 is connected. The operation lever 11 is pivotably connected to the support portion 34*b* of the movable element via a connection bracket 38. The electric actuator 10 is provided with a movable element detection switch 109 at a position where the attraction portion 34*a* of the movable element is located during standby.

The movable element further includes a cam portion 34*c* fixed to the attraction portion 34*a*. When the movable element is located at a standby position, the movable element detection switch 109 is operated by the cam portion 34*c*. When the movable element detection switch 109 is operated by the cam portion 34*c*, the movable element detection switch 109 transitions from an on state to an off state or from the off state to the on state. Accordingly, it is possible to detect whether the movable element is located at the standby position according to a state of the movable element detection switch 109. In the present embodiment, a safety controller 103 determines whether the movable element is located at the standby position based on the state of the movable element detection switch 109.

In the present embodiment, the movable element detection switch 109 is in the on state when the movable element detection switch 109 is operated by the cam portion 34*c*.

In the movable element (34*a*, 34*b*, 34*c*) according to the present embodiment, at least the attraction portion 34*a* is made of a magnetic material. Soft magnetic materials such as low-carbon steel and permalloy (iron-nickel alloy) are preferably used as the magnetic material.

Other mechanism units (36, 37, 39, 41) shown in FIG. 2 will be described later.

The electromagnets 35*a* and 35*b* are excited by a DC power supply 111. In an excitation circuit of the electromagnet 35*a*, one end of a coil of the electromagnet 35*a* is connected to a high potential side of the DC power supply 111 via electrical contacts 104*a*, 105*a* and a fuse 107*a* connected in series, and the other end of the coil of the electromagnet 35*a* is connected to a low potential side of the DC power supply 111. In an excitation circuit of the electromagnet 35*b*, one end of a coil of the electromagnet 35*b* is connected to the high potential side of the DC power supply 111 via electrical contacts 104*b*, 105*a* and a fuse 107*b* connected in series, and the other end of the coil of the electromagnet 35*b* is connected to the low potential side of the DC power supply 111.

In the present embodiment, the DC power supply 111 includes a rectifier or a power converter that converts AC power from a commercial AC power supply into DC power. In the present embodiment, a DC power supply having a backup function of compensating for power supply to a load for a short time during a power outage is applied as the DC power supply 111.

The fuses 107*a*, 107*b* are provided in the excitation circuits to protect the electromagnets 35*a*, 35*b* from an overcurrent.

The electrical contacts 104*a*, 105*a*, 104*b*, 105*b* are controlled to be on and off by the safety controller 103. In the standby state of the electric actuator 10, the safety controller 103 controls each of the electrical contacts 104*a*, 105*a*, 104*b*, 105*b* to be in an on state. When the coils of the electromagnets 35*a*, 35*b* are energized, the electromagnets 35*a*, 35*b* generate electromagnetic forces.

Each of the electrical contacts 104*a*, 105*a*, 104*b*, 105*b* is implemented by a contact provided in, for example, an electromagnetic relay, an electromagnetic contactor, and an electromagnetic switch. In each of the excitation circuits of the electromagnets 35*a*, 35*b*, a plurality of (two in FIG. 2) electrical contacts are connected in series. Accordingly, even if an on failure occurs in one contact when the plurality of electrical contacts are controlled to be in an off state to actuate the emergency stop device 2 as to be described later, energization of the electromagnet is cut off. Accordingly, operation reliability of the electric actuator 10 is improved. The on failure occurs due to, for example, welding of a contact.

Other electrical device portions (37, 112) will be described later (FIGS. 3 and 4). Signal lines 106*a*, 106*b* are used to input answer back signals from the excitation circuits of the electromagnets 35*a*, 35*b* to the safety controller 103.

An answer back signal (hereinafter referred to as an "answer back signal (106*a*)") input to the safety controller 103 via the signal line 106*a* indicates a potential of one of the two ends of the coil of the electromagnet 35*a* which is connected to the high potential side of the DC power supply 111 via the electrical contacts 104*a*, 105*a*. Accordingly, the answer back signal (106*a*) indicates a potential (a high potential (HIGH)) on the high potential side of the DC power supply 111 when the electromagnet 35*a* is energized, and indicates a potential (a low potential (LOW)) on the low potential side of the DC power supply 111 when the electromagnet 35*a* is not energized. The safety controller 103 detects an energization state of the electromagnet 35*a* based on a potential indicated by the answer back signal (106*a*).

An answer back signal (hereinafter referred to as an "answer back signal (106*b*)") input to the safety controller 103 via the signal line 106*b* indicates a potential of one of the two ends of the coil of the electromagnet 35*b* which is connected to the high potential side of the DC power supply 111 via the electrical contacts 104*b*, 105*b*. Accordingly, r back signal (106*b*) indicates a potential (a high potential (HIGH)) on the high potential side of the DC power supply 111 when the electromagnet 35*b* is energized, and indicates a potential (a low potential (LOW)) on the low potential side of the DC power supply 111 when the electromagnet 35*b* is not energized. The safety controller 103 detects an energization state of the electromagnet 35*b* based on a potential indicated by the answer back signal (106*b*).

Next, an operation of the electric actuator 10 when the emergency stop device 2 is actuated will be described.

When the safety controller 103 detects a predetermined overspeed state (the above-described second overspeed) of the car 1 based on a rotational position signal from the rotary detector 6, the safety controller 103 outputs an off command to each of the electrical contacts 104*a*, 105*a*, 104*b*, 105*b*. In response to the off command, the electrical contacts 104*a*, 105*a*, 104*b*, 105*b* transition from an on state (FIG. 2) to an off state. Therefore, excitation of the electromagnets 35*a*, 35*b* is stopped, and thus electromagnetic forces acting on the movable element (34*a*, 34*b*, 34*c*) disappear. Accordingly, the restriction on the movable element by the attraction of the attraction portion 34*a* of the movable element to the electromagnets 35*a*, 35*b* is released, and thus the movable element is moved by the biasing force (F shown in FIG. 2) of the drive spring 13 from a position (FIG. 2) in the standby state in a direction (a rightward direction in the drawing) of the biasing force of the drive spring 13.

As the restriction on the movable element is released, the drive shaft 12 is driven by the biasing force of the drive spring 13 (FIG. 1) acting on the pressing member 15 (FIG. 1) of the drive shaft 12 in a direction from the fixed portion 14 (FIG. 1) toward the pressing member (FIG. 1). When the drive shaft 12 is driven, the first link member (the operation lever 11 and the first actuating piece 16: FIG. 1) connected to the drive shaft 12 pivots about the first actuating shaft 19 (FIG. 1). Accordingly, the pull-up rod 21 (FIG. 1) connected to the first actuating piece 16 is pulled up. When the drive shaft 12 is driven, the second link member (the connection piece 17 and the second actuating piece 18: FIG. 1) connected to the drive shaft 12 pivots about the second actuating shaft 20 (FIG. 1). Accordingly, the pull-up rod 21 (FIG. 1) connected to the second actuating piece 18 is pulled up.

Next, a return operation of the electric actuator 10 will be described.

In the present embodiment, the return operation is executed according to an actuated state of the electric actuator 10 during power restoration.

FIG. 3 is a plan view showing an operation state of the electric actuator 10 during a return operation (immediately before completion) and is a plan view of the electric actuator 10 similar to that shown in FIG. 2.

To return the electric actuator 10 from an actuated state to the standby state as shown in FIG. 2, as will be described later, the movable element (34*a*, 34*b*, 34*c*) is returned from a moved position (a position P in FIG. 3) to the standby position (FIG. 2) by the mechanism units (36, 37, 39, 41) and the electrical device portions (37, 112) which are omitted in FIG. 2.

The electric actuator 10 includes a feed screw 36 for driving the movable element. The feed screw 36 is coaxially connected to a rotation shaft of a motor 37 and is rotatably supported by a support member 41. The electromagnets 35*a*, 35*b* are fixed to an electromagnet support plate 39 including a feed nut portion (not shown). The feed nut portion of the electromagnet support plate 39 is screwed with the feed screw 36. The feed screw 36 is rotated by the motor 37. The motor 37 is driven by a motor controller 112.

The motor controller 112 includes a drive circuit for the motor 37, and controls rotation of the motor 37 according to a control command from an elevator controller 7. The motor 37 may be either a DC motor or an AC motor.

The elevator controller 7 controls a normal operation of the car 1 and has information on an operation state of the car 1. In the present embodiment, as described above, the elevator controller 7 further has a function of controlling the motor 37 provided in the electric actuator 10.

When the electric actuator 10 is returned to the standby state, the elevator controller 7 sends a rotation command for the motor 37 to the motor controller 112. Upon receiving the rotation command, the motor controller 112 drives the motor 37 to rotate the feed screw 36. The rotation of the motor 37 is converted into linear movement of the electromagnets 35*a* and 35*b* along an axial direction of the feed screw 36 by the rotating feed screw 36 and the feed nut portion of the electromagnet support plate 39. Accordingly, the electromagnets 35*a* and 35*b* approach the moved position P of the movable element (34*a*, 34*b*, 34*c*) shown in FIG. 3, and come into contact with the movable element.

The motor controller 112 monitors a motor current for controlling the motor 37. When the electromagnets 35*a* and 35*b* come into contact with the movable element as described above, a load of the motor 37 increases, and the motor current increases accordingly. When the motor current increases and exceeds a predetermined value, the motor controller 112 determines that the electromagnets 35*a* and 35*b* come into contact with the movable element. The motor controller 112 sends a determination result to the safety controller 103 and the elevator controller 7.

Upon receiving the determination result from the motor controller 112, the safety controller 103 outputs an on command to each of the electrical contacts 104*a*, 105*a*, 104*b*, 105*b*. In response to the on command, the electrical contacts 104*a*, 105*a*, 104*b*, 105*b* transition from an off state to an on state. Therefore, the electromagnets 35*a*, 35*b* are excited. The attraction portion 34*a* of the movable element is attracted to the electromagnets 35*a*, 35*b* by the electromagnetic forces of the excited electromagnets 35*a*, 35*b*.

Upon receiving the determination result from the motor controller 112, the elevator controller 7 sends a reverse rotation command for the motor 37 to the motor controller 112. Upon receiving the reverse rotation command, the motor controller 112 reverses a rotation direction of the motor 37 and rotates the feed screw 36 in a reverse direction. Accordingly, the movable element attracted to the electromagnets 35*a*, 35*b* receives a biasing force of the drive spring 13, and moves toward the standby position (FIG. 2) together with the electromagnets 35*a*, 35*b*.

The cam portion 34*c* of the movable element (34*a*, 34*b*, 34*c*) is separated from the movable element detection switch 109 from when the electric actuator 10 is actuated and the movable element (34*a*, 34*b*, 34*c*) moves to the position P (FIG. 3) up to immediately before the completion of the return operation of the electric actuator 10 (FIG. 3). Accordingly, the movable element detection switch 109 is in an off state at this time.

FIG. 4 is a plan view showing an operation state of the electric actuator 10 when the return operation is completed and is a place view of the electric actuator 10 similar to that shown in FIG. 2.

When the movable element (34*a*, 34*b*, 34*c*) attracted to the electromagnets 35*a*, 35*b* reaches the standby position, the movable element detection switch 109 is operated by the cam portion 34*c* of the movable element. When the movable element detection switch 109 is operated, the elevator controller 7 determines that the movable element is located at the standby position. The elevator controller 7 sends a stop command for the motor 37 to the motor controller 112 based on this determination result. Upon receiving the stop command, the motor controller 112 stops the rotation of the motor 37.

As will be described later, during power restoration, the elevator controller 7 first checks an operation state of the electric actuator 10 based on and off states of the movable element detection switch 109. When the movable element detection switch 109 is in an off state, the elevator controller 7 determines that the electric actuator 10 is actuated during a power outage. In addition, the elevator controller 7 checks an operation state of the electric actuator 10 based on and off state of the movable element detection switch 109 after a return operation is instructed during power restoration. In this case, the elevator controller 7 determines that the return operation is successful when the movable element detection switch 109 is in an on state, and determines that the return operation fails when the movable element detection switch 109 is in an off state.

FIG. 5 is diagram showing an operation state of the car 1 and showing a power outage operation function of the elevator apparatus according to the present embodiment.

Since a power outage occurs while the car 1 is traveling between a floor FA and a floor FB, the car 1 stops between the floor FA and the floor FB immediately after power restoration (see the "car 1" shown in the center of FIG. 5). As a DC power supply for an electromagnet disappears during a power outage, the movable element (only the attraction portion 34*a* is shown) is separated from the electromagnet 35*a*. That is, the electric actuator 10 is actuated, and the emergency stop device is actuated.

When the return operation of the electric actuator 10 is executed and the movable element attracted to the electromagnet 35*a* is returned to the standby position, that is, when the return operation is successful, the car 1 is operated to move down from a stop position (see an arrow DN) and lands on the nearest floor FA below the stop position.

When the movable element is not attracted to the electromagnet 35*a* and the movable element is not returned to the standby position even though the return operation of the electric actuator 10 is executed, that is, when the return operation fails, the car 1 is operated to move up from the stop position (see an arrow UP) and lands on the nearest floor FB above the stop position.

When the return operation is successful, the emergency stop device 2 is released as the electric actuator 10 is actuated. Accordingly, the car 1 can be operated. In the present embodiment, when the return operation is successful, a floor closer to a lobby floor and below the stop position is set as a nearest floor in consideration of a case of a rescue operation. Alternatively, a floor above the stop position may be set as a nearest floor. Further, in the present embodiment, even when the return operation is successful, it is assumed that an abnormality occurs in the stop of the car 1 and an operation of the emergency stop device 2 due to the power outage, and the car 1 lands on the nearest floor. Alternatively, an operation of the car 1 may be returned to a normal operation.

When the return operation fails, the emergency stop device 2 is not released even if the electric actuator 10 is actuated. In the present embodiment, the car 1 is operated to move up, the emergency stop device 2 is released, and the car 1 is moved from the stop position to a nearest floor above the stop position. In the present embodiment, since the car 1 stops due to a power outage, an increase in rail pressing forces of braking elements of the emergency stop devices 2 due to moving-down of the car does not occur. Accordingly, the emergency stop device 2 can be relatively easily released.

As described above, the elevator apparatus according to the present embodiment has a power outage operation function while including an emergency stop device that is actuated by the electric actuator 10.

FIG. 6 is a flowchart showing power outage operation processing according to the present embodiment.

The power outage operation processing is executed by the elevator controller 7. The elevator controller 7 according to the present embodiment includes a computer system such as a microcomputer. The elevator controller 7 executes the power outage operation processing by executing a predetermined program by the computer system.

When the processing is started during power restoration, in step S1, the elevator controller 7 determines whether the movable element detection switch 109 is in an off state. That is, the elevator controller 7 determines whether the electric actuator 10 is actuated during a power outage. When the elevator controller 7 determines that the movable element detection switch 109 is in the off state (YES in step S1), next, the elevator controller 7 executes step S4, and when elevator controller 7 determines that the movable element detection switch 109 is not in the off state, that is, when the movable element detection switch 109 is in an on state (NO in step S1), next, the elevator controller 7 executes step S2.

In the present embodiment, when a backup function of the DC power supply 111 for the electromagnets 35*a*, 35*b* is normal, the electromagnetic forces of the electromagnets 35*a*, 35*b* are maintained during a power outage, and the standby state of the electric actuator 10 is maintained. Accordingly, the movable element detection switch 109 is in an on state during power restoration. When the backup function is insufficient or abnormal, for example, when a power outage time is longer than a guarantee time of the backup function, the electromagnetic forces of the electromagnets 35*a*, 35*b* disappear, and thus the electric actuator 10 is actuated. Accordingly, the movable element detection switch 109 is in an off state during power restoration.

In step S2, the elevator controller 7 determines whether a stop position of the car 1 is outside a door openable zone based on a signal from a position detector (not shown) for operation control. In the present embodiment, a position detector according to a known technique, for example, a position detector including a shield plate provided in a hoistway and a photoelectric sensor provided in a car is applied.

When the elevator controller 7 determines that the stop position of the car 1 is outside the door openable zone (YES in step S2), next, the elevator controller 7 executes step S3. When the elevator controller 7 determines that the stop position of the car 1 is not outside the door openable zone, that is, the stop position of the car 1 is in the door openable zone (NO in step S2), the elevator controller 7 ends the series of processing and executes normal operation control.

In step S3, the elevator controller 7 operates the car 1 to move down (DN) from the stop position to the door openable zone, and lands the car 1 on a nearest floor below the stop position. After step S3, when the elevator controller 7 determines that the car 1 is not outside the door openable zone, that is, when the car 1 is in the door openable zone (NO in step S2), the elevator controller 7 ends the series of processing and executes normal operation control.

In step S4, the elevator controller 7 instructs the motor controller 112 to rotate the motor 37 forward and backward in order to return the electric actuator 10 to the standby state. After step S4, the elevator controller 7 executes step S5.

In step S5, the elevator controller 7 determines whether the movable element detection switch 109 is in an off state. That is, the elevator controller 7 determines whether the return operation of the electric actuator 10 fails. When the elevator controller 7 determines that the movable element detection switch 109 is in an off state (YES in step S5), next, the elevator controller 7 executes step S6, and when the movable element detection switch 109 is not in an off state, that is, when the movable element detection switch 109 is in an on state (NO in step S5), next, the elevator controller 7 executes step S2. Processing in and after step S2 is as described above.

In step S6, the elevator controller 7 determines whether a passenger is detected in the car 1 based on a signal from a load sensor (not shown) provided in the car 1 or a camera provided in the car 1. When the elevator controller 7 determines that a passenger is detected (YES in step S6), next, the elevator controller 7 executes step S7, and when the elevator controller 7 determines that no passenger is detected (NO in step S6), the elevator controller 7 skips steps S7 to S9, and next executes step S10.

In step S7, the elevator controller 7 determines whether a stop position of the car 1 is outside the door openable zone, as in step S2 described above. When the elevator controller 7 determines that the stop position of the car 1 is outside the door openable zone (YES in step S7), next, the elevator controller 7 executes step S8, and when the elevator controller 7 determines that the stop position of the car 1 is not outside the door openable zone, that is, the stop position of the car 1 is in the door openable zone (NO in step S7), the elevator controller 7 skips step S8, and next executes step S9.

In step S8, the elevator controller 7 operates the car 1 to move up (UP) from the stop position to the door openable zone, and lands the car 1 on a nearest floor above the stop position. After step S8, the elevator controller 7 executes step S9.

In step S9, the elevator controller 7 controls a door drive device (not shown) provided in the car 1 to open a car door and a landing door (not shown). Further, when a predetermined time elapses after a car door switch (not shown) detects opening of a door, the elevator controller 7 controls the door drive device (not shown) to close the car door and the landing door (not shown). Accordingly, a passenger in the car 1 can get out of the car 1 at a nearest floor. After step S9, the elevator controller 7 executes step S10.

In step S10, the elevator controller 7 rotates the motor 37 forward and backward as in step S4. That is, the elevator controller 7 causes the electric actuator 10 to perform the return operation again. After step S10, the elevator controller 7 executes step S11.

In step S11, the elevator controller 7 determines whether the movable element detection switch 109 is in an off state. That is, the elevator controller 7 determines whether the return operation of the electric actuator 10 fails again. When the elevator controller 7 determines that the movable element detection switch 109 is in the off state (YES in step S11), next, the elevator controller 7 executes step S12, and when elevator controller 7 determines that the movable element detection switch 109 is not in the off state, that is, when the movable element detection switch 109 is in an on state (NO in step S11), next, the elevator controller 7 executes step S2. Processing in and after step S2 is as described above.

In step S12, the elevator controller 7 stops the operation control of the car 1. That is, the elevator controller 7 stops an operation of the elevator apparatus that is a control target. After step S12, the elevator controller 7 executes step S13.

In step S13, the elevator controller 7 transmits an abnormal alert to a monitor server of a control center that remotely monitors an operation state of the elevator apparatus.

After step S13, the elevator controller 7 ends a series of processing and keeps the elevator apparatus in an operation stop state.

As described above, according to the present embodiment, the elevator apparatus including the emergency stop device 2 actuated by the electric actuator 10 can have a power outage operation function. According to the present power outage operation function, even when the return operation of the electric actuator 10 fails after a power outage occurs, the car 1 can be operated to a nearest floor from a stop position during the power outage.

The present embodiment can be applied not only to a case of power restoration but also to a case where the car 1 is operated using a storage battery as a power supply during a power outage.

The invention is not limited to the above-described embodiment, and includes various modifications. For example, the embodiment described above is described in detail to facilitate understanding of the invention, and the invention is not necessarily limited to those including all configurations described above. One configuration can be added deleted from, or replace a part of the configurations of the embodiment.

For example, instead of the movable element detection switch 109, another position detection sensor such as a photoelectric position sensor, a magnetic position sensor, and a proximity sensor (capacitive or inductive) may be applied.

The electric actuator 10 may be provided at a lower portion or a side portion of the car 1, in addition to the upper portion.

The elevator apparatus may further include a machine room, or may be a so-called machine room-less elevator having no machine room.

REFERENCE SIGNS LIST

- 1: car
- 2: emergency stop device
- 4: guide rail
- 5: roller
- 6: rotary detector
- 7: elevator controller
- 10: electric actuator
- 11: operation lever
- 12: drive shaft
- 13: drive spring
- 14: fixed portion
- 15: pressing member
- 16: first actuating piece
- 17: connection piece
- 18: second actuating piece
- 19: first actuating shaft
- 20: second actuating shaft
- 21: pull-up rod
- 30: case

34*a*: attraction portion
34*b*: support portion
34*c*: cam portion
35*a*, 35*b*: electromagnet
36: feed screw
37: motor
38: connection bracket
39: electromagnet support plate
41: support member
50: crosshead
103: safety controller
104*a*, 105*a*, 104*b*, 105*b*: electrical contact
106*a*, 106*b*: signal line
107*a*, 107*b*: fuse
109: movable element detection switch
111: DC power supply
112: motor controller

The invention claimed is:

1. An elevator apparatus comprising:
a car;
an emergency stop device provided on the car;
a drive mechanism configured to drive the emergency stop device;
an electric actuator configured to actuate the drive mechanism; and
a control device configured to control an operation of the car, wherein
the electric actuator includes
a movable element mechanically connected to the drive mechanism,
an electromagnet facing the movable element, and
a mechanism unit configured to convert rotation of a motor into linear movement of the electromagnet, and
in a case where the control device determines that the electric actuator is actuated due to a power outage, the control device
instructs the electric actuator to perform a return operation of returning the movable element to a standby position by the mechanism unit, and
operates the car to move up and lands the car on a nearest floor above a stop position of the car when the control device determines that the return operation fails.

2. The elevator apparatus according to claim 1, wherein the control device operates the car to move down and land the car on a nearest floor below the stop position of the car when the control device determines that the return operation is successful.

3. The elevator apparatus according to claim 1, further comprising:
a position detector configured to detect a position of the movable element, wherein
the control device determines whether the electric actuator is actuated due to the power outage based on a position detection signal from the position detector.

4. The elevator apparatus according to claim 1, further comprising:
a position detector configured to detect a position of the movable element, wherein
the control device determines whether the return operation fails based on a position detection signal from the position detector.

5. The elevator apparatus according to claim 1, wherein
when the control device determines that the return operation fails, the control device determines whether the stop position of the car is outside a door openable zone, and
when the control device determines that the stop position is outside the door openable zone, the control device operates the car to move up and lands the car on the nearest floor.

6. The elevator apparatus according to claim 5, wherein when the control device determines that the stop position is not outside the door openable zone, the control device opens a car door and a landing door.

7. The elevator apparatus according to claim 1, wherein
when the return operation fails, next, the control device determines whether a passenger is detected, and
when the control device determines a passenger is detected, the control device operates the car to move up and lands the car on the nearest floor.

8. The elevator apparatus according to claim 7, wherein
in a case where the control device determines that no passenger is detected, the control device
instructs the electric actuator to perform the return operation again, and
stops operation control of the car when the control device determines that the return operation fails again.

* * * * *